United States Patent
Hreniuk

(10) Patent No.: US 9,045,146 B2
(45) Date of Patent: *Jun. 2, 2015

(54) BINARY TRACK SAFETY TRAVERSE SYSTEM RECONFIGURABLE TO PROVIDE SAFE TRAJECTORIES OVER A WIDE RANGE OF INCLINATIONS

(71) Applicant: Darren W. Hreniuk, San Jose (CR)

(72) Inventor: Darren W. Hreniuk, San Jose (CR)

( * ) Notice: Subject to any disclaimer, the term of this patent is extended or adjusted under 35 U.S.C. 154(b) by 100 days.

This patent is subject to a terminal disclaimer.

(21) Appl. No.: 13/965,324

(22) Filed: Aug. 13, 2013

(65) Prior Publication Data
US 2014/0007789 A1    Jan. 9, 2014

Related U.S. Application Data

(63) Continuation of application No. 11/407,045, filed on Apr. 20, 2006, now Pat. No. 8,505,462.

(51) Int. Cl.
*B61B 7/00*    (2006.01)
*B61B 12/00*   (2006.01)

(52) U.S. Cl.
CPC ............... *B61B 7/00* (2013.01); *B61B 12/005* (2013.01); *Y02T 30/30* (2013.01)

(58) Field of Classification Search
CPC .............. B61B 7/00; B61B 7/02; B61B 7/04; B61B 9/00; B61B 10/00; B61B 10/02

USPC ................................ 104/112, 115, 117, 117.1
See application file for complete search history.

(56) References Cited

U.S. PATENT DOCUMENTS 8,505,462 B2 *    8/2013    Mitchell ..................... 104/112

* cited by examiner

Primary Examiner — R. J. McCarry, Jr.
(74) Attorney, Agent, or Firm — Mueller Law, LLC; Jerry K. Mueller, Jr.

(57) ABSTRACT

The present invention is related to the field of mechanical engineering and describes an automatically adjustable system of traverse rails with multiple characteristics that extend the useful life of the sustain by a minimum factor of four while providing redundant security backup to the rails allowing human passengers to move from one place to another in and easy and safe manner with a minimum of noise and vibration while providing the owner of the system benefits of lower maintenance cost and less exposure to financial risk. Also the system can be installed in a multitude of natural places without the need to cut or damage the environment. Using the same components this system offers other configuration options to increase the possibilities of installing a system with desirable characteristics over a greater number of inclinations. Combining the various components starting with a smooth rail as in FIG. 1 with the self-equalizing system FIG. 3 for a maximum conservation of energy to maximum breaking rail with the skeleton braid in FIG. 2 with the maximum braking security system of in FIG. 4.

8 Claims, 3 Drawing Sheets

Figure 1:
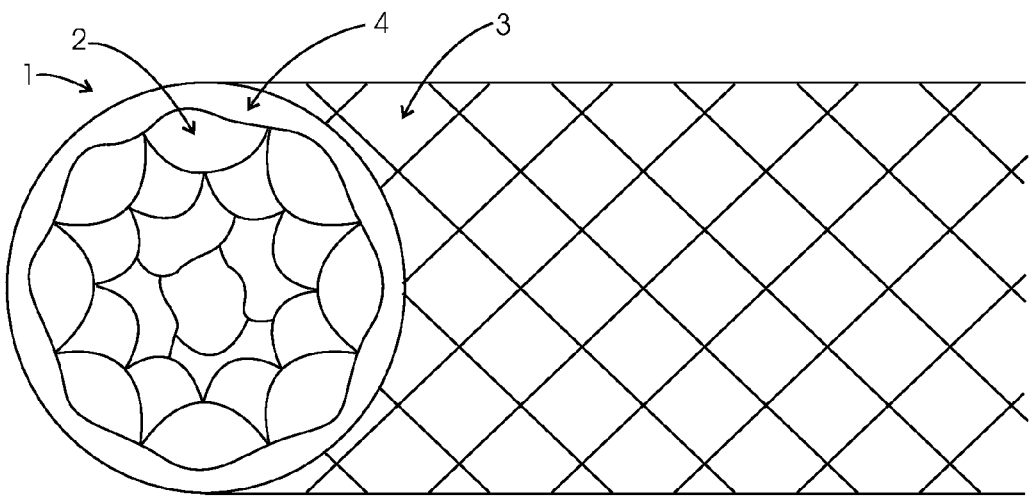

BINARY TRACK SAFETY TRAVERSE SYSTEM RECONFIGURABLE TO PROVIDE SAFE TRAJECTORIES OVER A WIDE RANGE OF INCLINATIONS

CROSS-REFERENCE TO RELATED APPLICATIONS

This application is a continuation of application Ser. No. 11/407,045, filed Apr. 20, 2006, now U.S. Pat. No. 8,505,462; which in turn claims priority to PCT/CR03/00002, filed Oct. 21, 3003.

This invention relates to the field of mechanical engineering, more specifically in relation to the transport of human passengers in forests and other natural areas where environmental impact is counter indicated and a more particularly, to a dual rail traverse systems which has a multiplicity of advanced safety and extended durability characteristics, providing a safety backup system as well as an overlapping series of redundancies to the track system allowing human passengers to move from location to location smoothly and safely while giving the owner of the system the benefits of lower maintenance costs and a drastically reduced exposure to financial risk. It also gives the designer a wider selection of configurations in order that he is not as limited by the environment as to where it is possible install it by increasing the range of angles of attack in the possible installation.

BACKGROUND OF THE INVENTION

The present application modifies mechanical engineering techniques and their application improving security and other characteristics related to the recreational activity commonly known as "Canopy Tour" which is a recreational activity invented by Darren Hreniuk (Canadian citizen and resident in Costa Rica) and patented in Costa Rica under the Patent # 2532 entitled "Sistema de Transporte Elevado Forestal Usando Ameses y Poleas en una Sola Linea Horizontal Usando la Gravedad como Propulsión" which comprises a series of suspended platforms in trees between which a rail is anchored at both ends and human passengers slide from a higher platform to a lower one while tethered to a pulley vehicle. Also known in the state of the art are a number of systems that move people are objects over rope from one fixed point to another such as U.S. Pat. No. 4,961,385 in which is described in automated transport system using the force of gravity to move a vehicle along the system of cables. The system of cables is manipulated by the use of hydraulic actuators. We can also mention the patent PCT/US89/01492 in which has revealed an aerial transport system with the characteristics of using a continuous loop cable to move a vehicle between two fixed points as well as mentioning U.S. Pat. No. 5,655,457 in which is described a system of supports for an aerial transport system which is comprised of a series of supports anchored to the ground which allow the adaptation of the trajectory of the cable to conform to topographic characteristics of the land and also serves as a method of tensing the cable. We can also name the U.S. Pat. No. 4,164,289 which describes an apparatus for the transportation of tree trunks by a system that uses cables and pulleys in conjunction with a hydraulic arm for the extraction of wood from valleys.

DISCLOSURE OF THE INVENTION

More precisely this patent application is related to the means by which we can improve the security and the useful life of the traverse component while in proving the experience of the users and reducing the cost of operation and most of all reducing exposure to risk and increasing the longevity of its useful life. Currently single strands of aircraft grade galvanized steel cable are used as the track. The experience of transporting several hundred thousand paying customers through the systems has led to several observations as to the limitations of the current system, and this invention is my solution to rectify the undesirable characteristics inherent in the original design.

Some of which are as follows:
1) The weight of steel cables limits the length of traverses possible, due to excessive horizontal load vectoring on the anchor trees.
2) Traversing on laid wire rope is noisy.
3) Passengers experience an annoying vibration as the pulley crosses the lays of the wire.
4) Repeated cycling of the wire causes metal fatigue resulting in undetectable weaknesses in the track leading to the possibility of catastrophic failure.
5) Due to the nature of the areas in which these systems are installed it is sometimes not possible to install all the platforms so that one traverse system such as the single wire rail system can accommodate the varied angels of attack that might be encountered thereby seriously limiting the safe options available to the designer.
6) Failure of the main rail results in the passenger falling to the ground. Lack of redundancy on any component is an undesirable characteristic on general principle and the present system of Patent #2532 must compensate for the lack thereof by increased monitoring costs as well as extra cautious track replacement schedules adding to overall cost.

From the points cited previously, I concluded as follows
1) New materials were required that were lighter than steel but just as strong, or stronger with the same elongation characteristics and without a surface that caused vibration. The new material needed to have better braking characteristics than steel cable in applications where braking is indicated while maintaining the ability that steel cable has for conservation of energy that is lost when high elongation rope is used in areas where conservation of potential energy (height) is not indicated.
2) A system where the designer could choose between a high braking rail and a high conservation of energy rail depending on the application was ideal.
3) A system that provided a second independent safety system was necessary.

The system that could provide more configuration possibilities with a minimum of components that can give the engineer the flexibility of installing a safe system in the widest variety of inclinations and distances

Solution: Part 1: New Rails

Experimentation and Experience with Rails

After an extended period of research and investigation the choices of material were narrowed down to: a) Ultra a high molecular weight polyethylene (UHMWPE) or b) Low modulus liquid crystal polymers.

Preliminary tests indicated that these types of material demonstrated some of the desirable characteristics necessary to upgrade the current system when used in a braided or double braid configuration and the elongation characteristics are stabilized through pre-cycling; however certain limitations were encountered after extended experimentation.

These limitations were as follows:

a) UMMWPE has an undesirably high cold flow or creep characteristic and low resistance to abrasion that could result in an unacceptably fast deterioration under constant load and braking application maneuvers, making it unsuitable for this purpose unless this problem can be overcome by other means.

b) Liquid Crystal Polymer has less cold flow creep, however it is susceptible to deterioration from exposure to ultraviolet radiation and under the current application, a protective sheath (mantle) must cover the liquid crystal polymer core of any traverse rope, in order to protect it from mechanical wear as well as degradation from ultra violet light.

c) Further testing of the liquid crystal polymer "Kernmantle" design traverse rope showed shortcomings, the most serious of which was that repeated traversing in the same direction causes the mantle to travel in the direction of the traverse and bunch up in front of the anchor point The continually increasing compression caused on the core (kern) by the mantle as the number of cycles increase cause compression banding and bunching over the length of the traverse. The result is a series of points along the traverse where the core bunches up inside the mantle causing spots along the length of the traverse that experienced all of the flexing and therefore these points were experiencing excessive fatigue through repeated cycling and due to the nature of the liquid crystal polymer core were susceptible to shearing and catastrophic failure of the traverse rope which would result in the passenger falling to the ground. Even though this wear schedule is predictable, and an acceptable approximation of failure dates easily calculable, this lifespan is fiscally inadequate and failure when it does happen is too abrupt and complete.

d) This movement and creep characteristic also resulted in a wear patterning that precluded the possibility of flipping the rope in order to get even "braking" wear on both ends of the rope because after a double braid Kernmantle rope was subjected to this kind of wear, the surface was melted together and formed overlapping plates, like shingles, of mantle material that would stand up and break off if they were subjected to abrasion in the opposite direction. After only a few cycles like this, the mantle would fail and the rope would become useless.

e) This double braid "Kern mantle" (mantle over core) rope, as currently received from the manufacturer requires a two stage stabilizing process before installation. This has made the calculations for the pitch of the trajectory and tension required for final use very difficult in the following manner. I) new pre-stabilized rope was soft to the touch and the weave was not compressed. The mantle in its pristine condition was loose on top of the core and easily moved in both directions. The first step in conditioning the rope was to "stretch" the mantle in the direction of the throw in order to alleviate the problem of the mantle bunching up at regular intervals throughout the throw causing a rough ride. "Stretching" consisted or pulling the mantle repeatedly in the direction of the future traverse over the core so as to stretch the weave, leaving no slack and compressing the core with the mantle.

II) Once the rope was "stretched" and installed it needed to be subjected to a stabilizing interval that would bring the rope up to its optimum service characteristics. Until this was done the rope would be too soft and continue to stretch until fully stabilized. This was expensive, time consuming, and led to the possibility of miscalculating the angle and tension required for a particular traverse. The other problem lies within the manufacturing process itself as the stabilization characteristics from one batch to another change, it is possible to design a system based on one rope only to find that the subsequent replacement rope has drastically different stabilization characteristics leading to a problem of requiring to readjust the inclination of the trajectory in order to accommodate the new characteristics. The cost of reconfiguring an entire tour around the characteristics of each shipment of rope is prohibitive.

DESCRIPTION OF THE INVENTED RAILS

This system is comprised of rails with the following characteristics that solve the previously described problems in the following way.

Advanced tensile strength fiber is used as the primary track support system but is plasticized through an extruding process that impregnates the core fiber and leaves a rail surface of smooth plastic (1aiii) that also serves the multiple purpose of.

I) Preventing the load bearing structure inside from being exposed to contaminants as well as radiation.

II) Provides a smooth surface on which the vehicles can run with minimal vibration.

III) It eliminates the need for applying a mechanical conditioning process or "milking" previously used as a preventative measure to reduce the amount of bunching that the mantle experiences as the directional forces of the vehicle are applied during the "stabilizing" process IV) Totally eliminates the stabilizing process.

V) The plasticized track lasts three times as long as a braided "Mantle over core" rail VI) Can be manufactured initially in a "rapid" or high speed configuration for non braking applications and then easily converted postproduction to a slow high breaking configuration so the designer can apply the right configuration where it's necessary.

To extend the capabilities of the rails for applications that indicate the need for increased braking a simple modification to the primary configuration adds these characteristics is as follows: A second rail configuration adds a skeleton braid (FIG. 1) spun over the first extrusion. (i) This skeleton braid is then fixed in position by a final pass through the extruder after heating the surface of the first rail with the skeleton braid in place (ii) that bonds the skeleton braid in place so that when the braid is exposed after a few uses it (iii) remains in place providing the additional friction required in higher angle applications and providing the following characteristics a) more resistance where needed b) better breaking friction in high braking areas.

Description of the Functioning of the Dual Track Safety Traverse System

Solution 2: The Dual Track Safety System Using the New Rails to Their Maximum Potential The two configurations of rails cited can be utilized using a minimum of additional parts in the following two configurations of the binary system. This additional characteristic maximizes the advantages of the system which permit the designer to reconfigure the same pieces into configurations which permit the maximum retention of momentum where needed or loss of kinetic energy where needed which facilitates the maximum braking that is required at times to avoid obstacles for example in ecotourism applications it is impossible to cut trees to give the perfect trajectory for instance to avoid a tree or branch you may have to move the trajectory a little to the left or to the right of the obstacle or give it more inclination to pass below a branch. In the case that this obstacle is on the side of the mountain this detour can cause a loss of inclination sufficient to not arrive or a too severe inclination which is too fast for regular traverse. The flexibility of choice in the possible configurations in this application allows for the combination of two types of rails described as "system of maximum energy" (FIG. 3) or "maximum breaking configuration" (FIG. 4) so that the system can be reconfigured by the designer to give four distinct levels of resistance that go from a maximum conservation of kinetic energy to a maximum loss of kinetic energy and in this way the system can be adapted to be safe in a wide variety of topographies.

In configuration one (FIG. 3) The track is installed as a parallel self-equalizing system that distributes the passengers' weight evenly over two tracks, which operate in tandem when the passenger is suspended by a safety tether under the dual track vehicle unit (14) under normal operating conditions but independently should there be a failure at any point of the system. This provides the safety redundancy desired; and is described as follows:

One end of the traverse throw is comprised of two fixed free-end anchors or terminations, fixed independently to the anchor base. (9)

The other end is comprised of an anchor that allows the two parallel tracks to continuously redistribute their weight loads so as to stabilize at a point where both tracks bear equal weight throughout the traverse process. (10)

This process is then backed up by two separate redundant security anchor systems (11) that are attached in front of the self equalizer unit with a high strength separate tether (12) in such a way that a failure at any point of the rail would leave at least one functional rail intact in order to keep the passenger from falling. The self-equalizing pulley unit is attached to the base with a hinge (13) that allows the pulley to align with the attack angle of the traverse reducing stress at the point of connection with the anchor base as well as reducing torque, which If installed on a tree can cause compression injuries at the lower end of the anchor base.

In order to maximize the use of the rail system it may be flipped top to bottom (up and down on the horizontal axis) and end to end on the vertical axis, allowing for even distribution of wear attributable to manual braking which is required for people whose weight exceeds the "zero breaking weight" calculated into the trajectory characteristic of the tour. (The bigger you are the more you need to brake). In other words, breaking occurs on the bottom strand of the rail at the arrival platform only and when it reaches a point where the protective layer of the rail becomes thin it can be flipped to the upper position where he will not be subjected to any further friction and subsequently when the second surface also gets thin the entire traverse can then be flipped end to end and the thin surface will be used over the departure area where no breaking his required and the end that was previously over the departure area can be used for breaking both top and bottom strands. This advance aside from safety is one of the biggest advances from the operators' point of view as it effectively takes the increase in usable life achievement from the change to plastic rails and effectively quadruples it.

Figure 4:
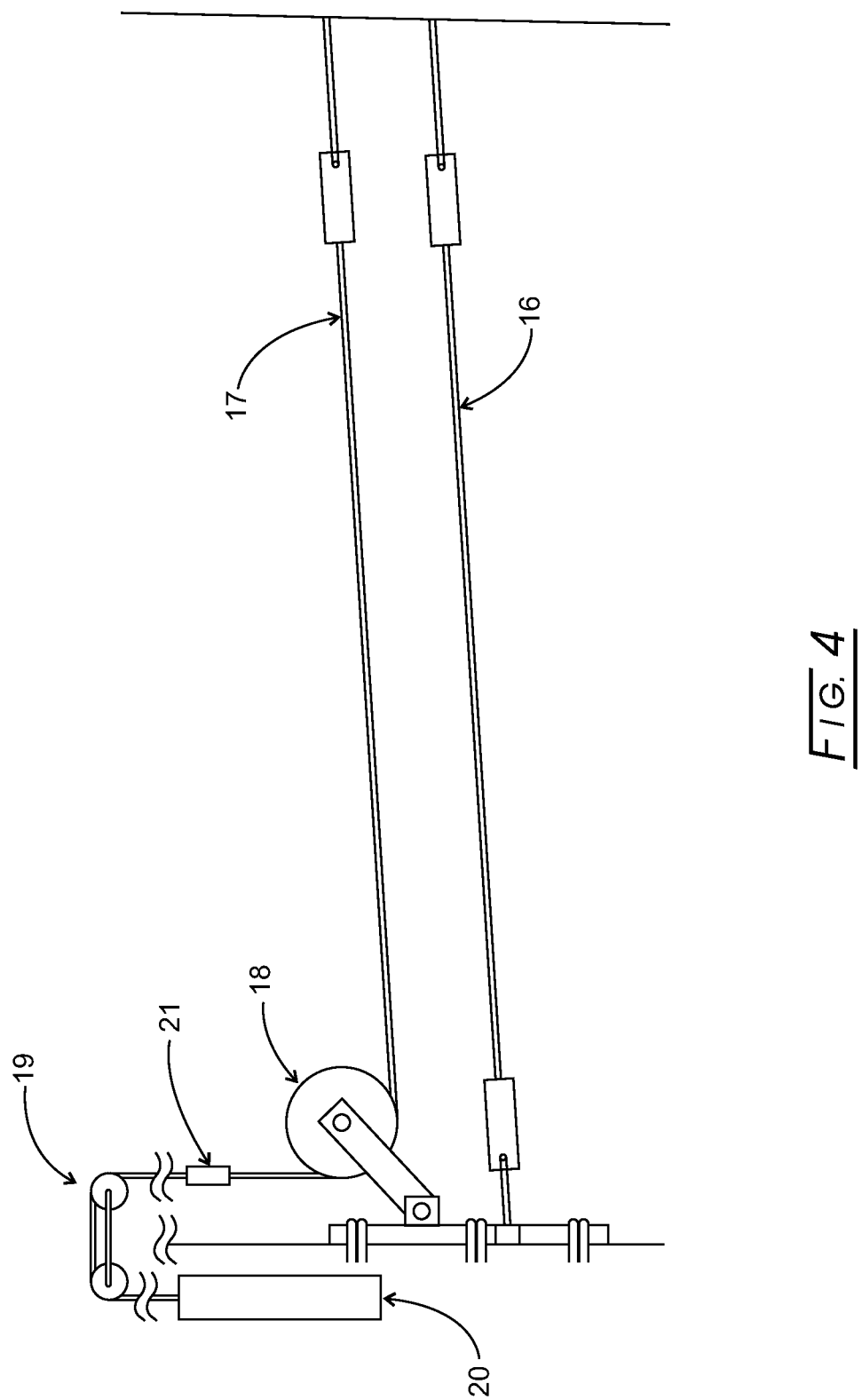

The Self Adjusting Variable Tension Dual Track Safety Traverse System for High Braking Applications (FIG. 4)

Thin inherent characteristic of The Self Equalizing Safety and Wear Reduction Track System is a marked reduction in breaking efficiency caused by the mechanical disadvantage inherent in the self-equalizing configuration itself. The reduced ability of the passenger to apply sufficient friction so they may to stop effectively is derived from the fact that their body weight is distributed evenly over the two rails and therefore reducing the amount of weight that can be applied to the braking surface by 50%.

Under most circumstances this reduced breaking efficiency would not be an issue because the attitude of the platforms would be adjusted to take into consideration the low efficiency breaking characteristics of the configuration and actually be a benefit where conservation of energy was required by distributing wear of the rail surface reducing replacement frequency of the rails. For applications where more breaking is indicated the same parts can be used to fabricate an auto adjustable safety system as follows:

A primary support rail (16) is suspended between the two anchor points and a secondary support rail (17) is placed at the same distance apart as (FIG. 3) above the primary rail but rather than be anchored on both ends, one end is spooled around a pulley (18) and a device used to take up tension is installed at one end and above the primary rail. (19) and (20) This can be a counter balance (19)-(20) or a bungee system, a spring or a strut with a spring and a damper that would take up the slack on the upper safety rail under normal operation but would have an arrester (21) that would come into play if the primary rail fails, catching the passenger safely and gently until a rescue can be performed. This would provide a multitude of other benefits that would overcome problems inherent in higher attack angle situations as well as provide a secondary safety that would still not interfere with the trajectory of the passenger.

In addition to the advantages available to the designer through the use of the two system configurations there are the two rail configurations. The smooth rail or the textured rail can be used in a multitude of configurations to achieve the desired breaking efficiency applicable to the trajectory configuration at each indicated application making the widest variety of safe alternatives available to the designer.

DRAWINGS

FIG. 1 the smooth surface rail corresponds with the high velocity configuration.

Figure 2:
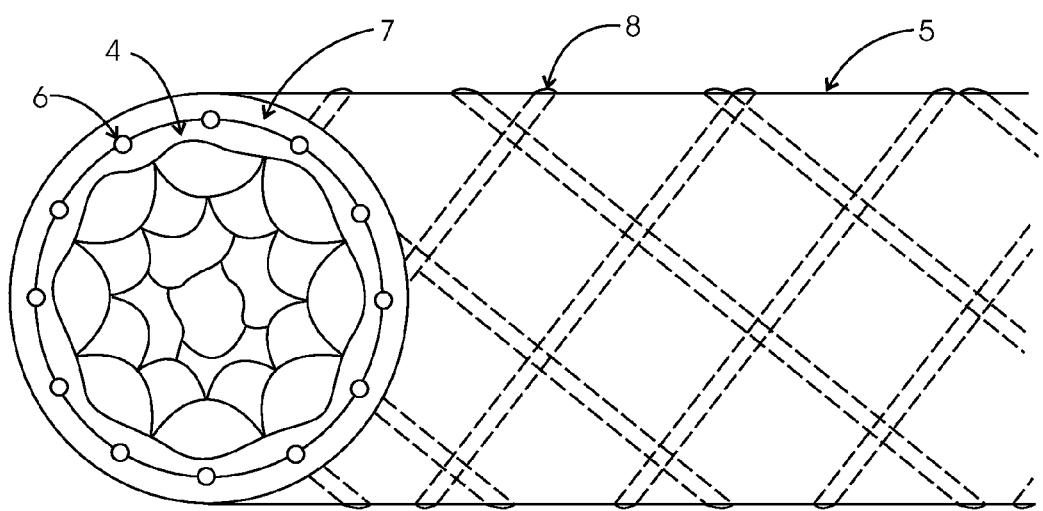

FIG. 2 the high resistance high breaking skeleton braid configuration

Figure 3:
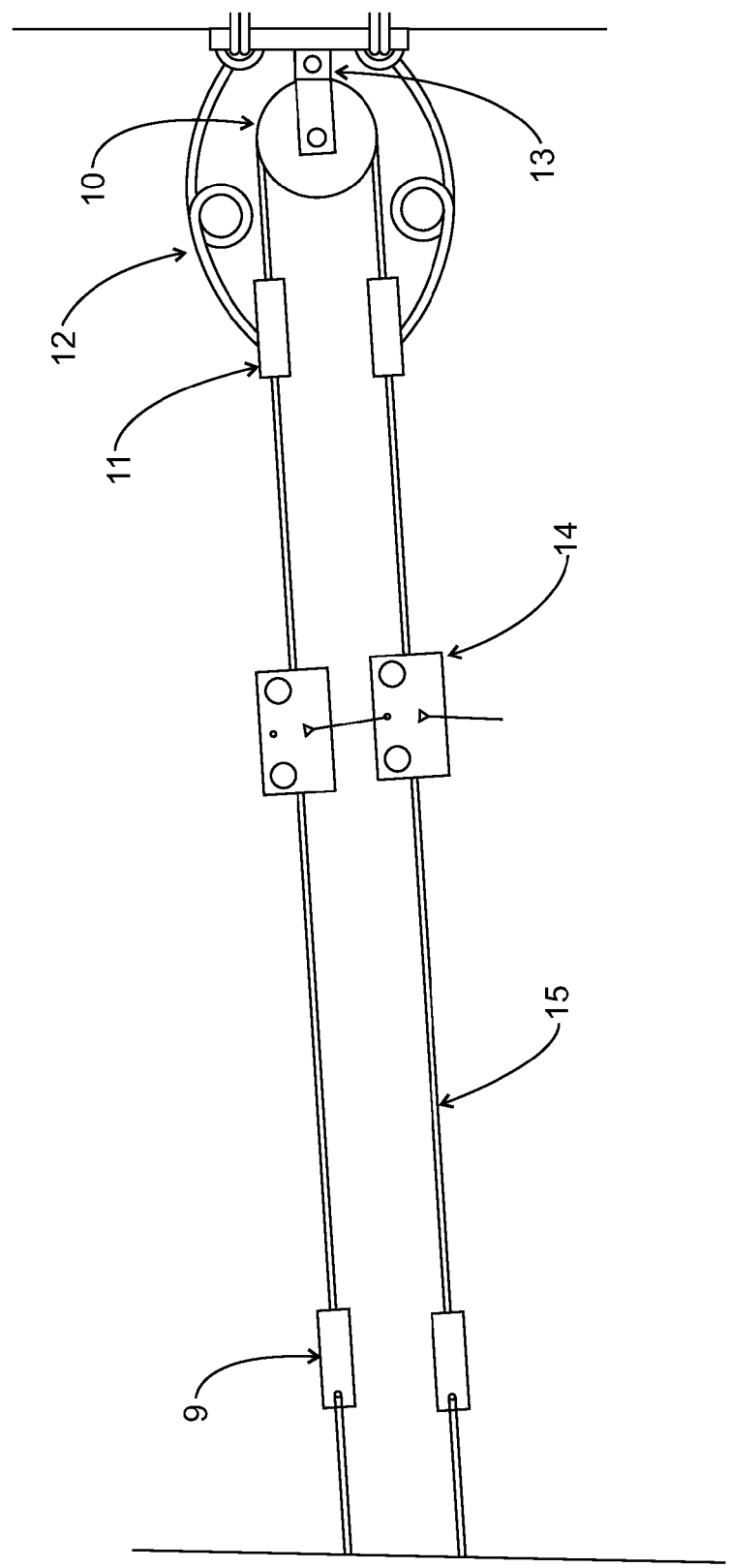

FIG. 3 the self equalizing binary safety system (fast configuration)

FIG. 4 the binary security system with auto adjustable security line (maximum braking configuration)

DETAILED DESCRIPTION

Drawing 1/3:
FIG. 1-1 High speed rail configuration
FIG. 1-2 The braided reinforcement core
FIG. 1-3 The smooth surfaced
FIG. 1-4 The extruded plastic jacket
FIG. 2-5 The skeleton braided high braking higher resistance rail configuration.
FIG. 2-6 The skeleton braid which is applied over the primary extrusion layer in FIG. 1-4
FIG. 2-7 The second extruded bonding layer.
FIG. 2-9 The textured skeleton braid as it appears through the second, bonding layer,
Drawing 2/3: FIG. 3
FIG. 3-9 Fixed free end terminations.
FIG. 3-10. Self-equalizing dual track termination unit with pivoting attitude arm
FIG. 3-11. Midline termination safety backup terminations
FIG. 3-12. Midline termination safety backup tether assembly
FIG. 3-13. Self-adjusting angle of attack centering hinge
FIG. 3-14 an over and under pulley vehicle
FIG. 3-15 A load bearing smooth flexible rail as in FIG. 1 or a load bearing textured flexible rail as in FIG. 2

Drawing 3/3: FIG. 4:

FIG. 4-16 A load bearing flexible rail anchored at both ends.

FIG. 4-17 A secondary flexible safety rail anchored at one with the other end passing through a FIG. 4-18 Deflection unit pulley with a pivoting attitude arm.

FIG. 4-19 Bungee, Strut, spring or counter balance safety line tension system FIG. 4-20 Counterbalance FIG. 4-21 A secondary arrester to act as a backup line slack limiting device

The invention claimed is:

1. A gravity binary rail security traverse system, which comprises:
   (a) an upper flexible rail having a pair of ends, each end affixed to a first upper base and to an upper second base, there being an inclination therebetween;
   (b) a lower flexible rail parallel to said upper flexible rail and having a pair of ends, each end affixed to a first lower base and to a second lower base, there being an inclination therebetween;
   (c) an upper pulley carried by said upper flexible rail;
   (d) an lower pulley carried by said lower flexible rail;
   (e) a vehicle unit affixed to said pulley and movable by gravity between said bases; and
   (f) said upper and lower pulleys being tethered together.

2. The binary rail security traverse system of claim 1, wherein at least one of said rails comprises fiber reinforced, extruded plastic.

3. The binary rail security traverse system of claim 2, wherein said fiber reinforced, extruded plastic comprises a an advanced, low modulus of elasticity, low cold flow fiber rope core covered and bonded to an outer extruded plastic jacket.

4. The binary rail security traverse system of claim 3, wherein said bonded outer extruded plastic jacket is covered with a second braided fiber layer bonded under a second outer extruded plastic layer being sufficiently thin to wear and expose the braid.

5. The binary rail security traverse system of claim 4, wherein said core or said braid is made from ultra high molecular weight polyethylene or a liquid crystal polymer.

6. The binary rail security traverse system of claim 1, wherein at least one of said rails comprises steel.

7. The binary rail security traverse system of claim 1, wherein one of more of said rails also is tethered to a base.

8. The binary rail security traverse system of claim 1, wherein both of said bases is the same base.

* * * * *